Figure 1:
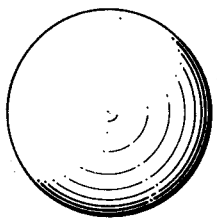

July 7, 1953 S. P. ROBINSON 2,644,799
HEAT-EXCHANGE PEBBLES
Filed May 5, 1949

INVENTOR.
S. P. ROBINSON
BY
ATTORNEYS

Patented July 7, 1953

2,644,799

UNITED STATES PATENT OFFICE 2,644,799

HEAT-EXCHANGE PEBBLES

Sam P. Robinson, Bartlesville, Okla., assignor to Phillips Petroleum Company, a corporation of Delaware Application May 5, 1949, Serial No. 91,649

19 Claims. (Cl. 252—455)

This invention relates to a process for the manufacture of pebbles for use in gravitating-bed heat-exchange processes and to pebbles made by such a process. The invention also relates to gravitating-bed heat-exchange processes utilizing improved cyclic thermal and mechanical shock resistant and abrasion resistant pebbles.

Pebble heater techniques currently being developed and applied to various gas heating and reaction processes make use of a compact stream of small refractory pebbles as a moving heat-exchange medium. These pebbles which are usually ceramic materials, although they may be metallic for some applications, are generally spheres ranging in size from about 1/8'' to 1'' in diameter. They may be either catalytic or non-catalytic to meet the requirements of any given process. In typical pebble heat-exchange processes a continuous compact mass of pebbles gravitates through a series of treating zones and the pebbles upon emerging from the lowermost zone are elevated by a suitable conveyor of the bucket, screw, or gas lift type to a point above the uppermost zone for again gravitating through the system. The uppermost zone is usually a pebble heating zone where the pebbles are contacted in countercurrent flow with a stream of hot combustion gas so as to raise the temperature of the pebbles to a desired degree as the pebbles descend through the heating zone. The resulting hot pebbles then pass through a connecting zone or zones into a reaction or gas heating zone where they impart heat to the gas being treated and in turn are cooled and require reheating. In some installations, a feed gas preheating zone is positioned just below the reaction or gas treating zone so as to further cool the pebbles before elevation and to preheat the feed gas going to the reaction zone. Other installations utilize a pebble preheating zone positioned directly above the pebble heating zone proper where the pebbles are contacted with the effluent from the reaction zone so as to recover a substantial portion of the sensible heat thereof and simultaneously quench the reaction product.

In another type of pebble heat-exchange process a gravitating mass of pebbles is utilized to maintain a cold zone or to cool a gas. The pebbles are cooled by contact with a cold gas in one chamber and the cold pebbles are then gravitated through a second chamber in contact with a gas to be cooled.

In still another type pebble heat-exchange process a cool gravitating stream of pebbles is contacted with the hot effluent from a high temperature process so as to quickly quench the effluent and simultaneously heat the pebbles. The hot pebbles then gravitate through a subjacent gas heating zone where they impart heat to a countercurrently flowing stream of gas. This type of process is illustrated in my copending application, Serial No. 767,300, filed August 7, 1947, now abandoned, wherein the fixation of atmospheric nitrogen at temperatures in the neighborhood of 4000° F. is effected and the hot effluent is passed through the upper chamber of a pebble heat-exchange unit so as to quench the reaction effluent before decomposition of the nitrogen oxides takes place. The hot stream of pebbles is gravitated through a subjacent heat-exchange chamber in contact with atmospheric air so as to heat the air to a relatively high temperature before passing it in admixture with fuel to the high temperature nitrogen-fixation furnace.

In processes of the type referred to hereinabove, the pebbles undergo great changes in temperature together with the usual mechanical shock and attrition forces attendant upon gravitating masses of pebbles thru pebble heater equipment. Pebble heat-exchange apparatus finds its greatest utility in processes which require extremely fast heating rates and therefore extremely fast pebble cooling rates with concomitant thermal shock to the pebbles. In pebble heater processes involving more severe heating and cooling requirements, the pebbles are subjected to heating rates higher than 1000° F. per minute and cooling rates greater than 2000° F. per minute involving maximum temperatures in the neighborhood of 3000° F. In addition to the severe shock resulting from such rapid temperature changes the pebbles are subjected to considerable mechanical shock and attrition in passing through the apparatus, especially in the elevator equipment and in dropping from the top of the elevator into the top of the pebble heating zone, as well as in passing through the chambers and relatively narrow inter-connecting ducts.

It is found that considerable breakage and attrition of the pebbles occurs when using commercially available pebbles under such severe conditions of operation; for example, in a pebble heater process requiring the circulation of between 25,000 and 35,000 pounds of pebbles per hour with a maximum temperature shock of approximately 1000° F. per minute, the attrition and breakage loss on the best available commercial pebbles amounts to at least 200 pounds per day and runs as high as 700 pounds per day, which is a loss of between 0.8 and 2% per day.

This substantial loss of pebbles due to attrition and breakage merely emphasizes the need for more rugged, attrition and shock resistant pebbles.

The principal object of the invention is to provide a pebble of improved abrasion and breakage resistance in cyclic heat-exchange processes. Another object of the invention is to provide a method of manufacturing a pebble having high resistance to attrition and breakage in gravitating-bed heat-exchange processes involving severe mechanical and thermal shock conditions and abrasion forces. It is also an object of the invention to provide improved heat-exchange processes, including hydrocarbon conversion, utilizing the more rugged pebbles of the invention. Other objectives of this invention will become apparent from a consideration of the accompanying disclosure.

The pebble of the invention comprises an alumina core of relatively coarse grain encased in a shell of relatively fine grain comprising alumina, alumina-mullite, or mullite. A pebble of extremely fine grain when heated at elevated temperatures in the neighborhood of 3000° F. presents a glazed extremely smooth surface which is highly resistant to abrasion when contacting other pebbles, the refractory lining of heat-exchangers, or the metal parts of pebble heater apparatus, such as elevator buckets, conduits, etc. However, it is found that if the entire pebble is composited of fine grain material, internal cracks develop in the core upon firing and these cracks developed during firing later cause pebble breakage in service. This invention permits the utilization of extremely fine grain material at the surface of the pebble while avoiding the difficulty of developing cracks and fissures in the core during firing. This is accomplished by compacting a pebble core of relatively coarse grain material and thereafter encasing the core in a shell of extremely fine grain material and heat treating the core and shell so as to form a firm bond in the pebble and fix the shell to the core by bonding the fine grains with the coarse grains of the outer surface of the core.

Figure 2:
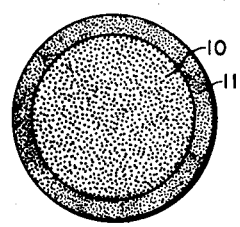
Figure 3:
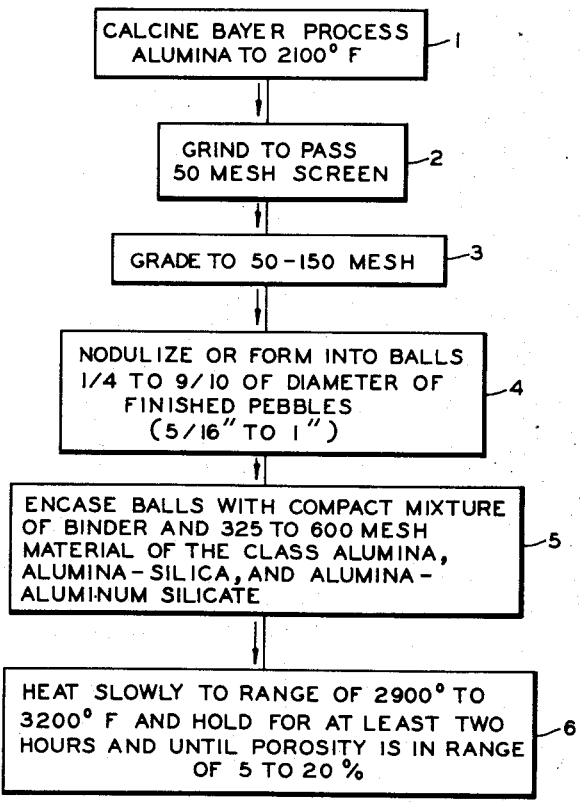

In the drawing Figure 1 illustrates the glazed generally spherical pebbles of the invention. Figure 2 shows a cross-section of the pebble having a core 10 of relatively coarse alumina and a shell encasing the core and composed of exceedingly fine grained material comprising alumina and/or mullite. Figure 3 is a flow diagram illustrating the sequence of steps in one embodiment of the process of the invention. The various figures of the drawing are self-explanatory and need no further explanation.

In compacting pebbles according to the invention, the pebble core is formed of relatively coarse grained alumina of high purity, preferably of 50 to 150 mesh size. Any method of compacting the alumina grains into compact relatively spherical shapes is suitable. One method comprises forming an extrudable plastic mix of the alumina grains with water and a suitable lubricant and/or binder, extruding the mix into relatively small rods ⅛" to ¾" in diameter, cutting the rods into slugs of a length equal to their diameter, and thereafter tumbling the slugs in rotating drum-type apparatus so as to form the slugs into compact spheres. These spheres which are to serve as the cores of my pebbles may then be fired and coated with the encasing shell of fine grain material or they may be encased first and fired later at the time the shell is fired.

Another method of forming the core is to start with a large alumina grain, such as 10 to 25 mesh, or a small slug of similar size formed by the preceding method, coat the starting grain or slug with a tacky organic binder, such as molasses, glue, shellac, rosin, etc., roll or otherwise coat the binder-coated core with powdered shell material of at least 325 mesh fineness until a coat of material is embedded in the binder and attached to the core to form a dry layer. This coating process is repeated until a thick enough layer of shell material has been added to form a pebble of the desired diameter. A preferred method of adding the fine shell material is to tumble the core alternately with a sticky organic binder or bonding agent and with the finely powdered shell material until an apparently dry layer has been built up.

A preferred method of forming the pebble cores is by nodulizing a mixture of 50 to 150 mesh precalcined alumina admixed with 5 weight per cent of powdered rosin. The alumina and rosin is tumbled in a cement-type mixer which gives 3-dimensional rotation during which the mass is swept with a current of hot air at a temperature above the melting point of the rosin which is around 300° F. A temperature as high as 400 to 450° F. may be used. The tumbling and rolling operation develops small spheres of the alumina and tacky rosin and when these spheres reach an average size of approximately ⅛" to ¾" they may be screened and separated after cooling into specific sizes for different size pebbles. The undersize cores may be returned to the nodulizer or returned to the crusher, together with the oversize cores, for reprocessing. The cores of a suitable size are then introduced to a 3-dimensional tumbling drum which is swept with hot air at a temperature just above 300° F. so as to heat up and soften the cores. At this stage a mixture of 325 to 600 mesh or finer material consisting of alumina, alumina-silica, or alumina-aluminum silicate admixed with 5 weight per cent of rosin in powdered form is introduced into the tumbling drum and the tumbling is continued with excess powdered fine grain material present until the pebbles have reached a suitable size.

The next step in the formation of pebbles is to lightly calcine the pebbles to carefully drive off the organic binder. This calcination should be effected at a temperature just above volatilization temperature of the binder. The calcination is then concluded in the same or a different kiln until the pebble has been fired for at least 2 hours in the range of 2900 to 3200° F. and until a porosity of 5 to 20 per cent has been obtained.

Materials particularly suitable for the formation of the fine grained glazed shell are alumina, alumina-mullite, and mullite. When utilizing alumina-mullite it is preferred to form the mullite in the shell during the calcination process by reacting alumina and silica or by converting aluminum silicates of the formula $Al_2O_3 \cdot SiO_2$ or $Al_2O_3 \cdot 2SiO_2$ to mullite which has the formula $3Al_2O_3 \cdot 2SiO_2$. In this manner the core is coated with layers of alumina and aluminum silicate in proportions so that when the aluminum silicate is converted to mullite during firing the silica freed in the reaction is reacted with free alumina so as not to leave free silica in the shell, which would decrease the shock resistance of the pebble. When the shell is compacted from alumina and silica grains, the alumina and silica in powdered form should be thoroughly mixed so as to produce a homogeneous mixture and it is preferred that the mol ratio of alumina to silica be at least 3:2 so as to insure reaction of all of the silica present with alumina to form mullite. A surplus of free alumina after firing is desirable. The aluminum silicates which may be incorporated in the shell in addition to mullite include andalusite, kyanite, sillimanite (all of the formula $Al_2O_3 \cdot SiO_2$), kaolin and ball clays (of the formula $Al_2O_3 \cdot 2SiO_2$)

containing substantially pure aluminum silicates free of significant amounts of iron and other glass forming elements.

The incorporation or formation of mullite in the shell is preferred together with free alumina since it has been found that mullite stabilizes alpha corundum crystals by preventing the growth and maintains the grain in the shell in fine crystal form after repeated cycles through pebble heat exchange apparatus. The mullite in the shell in contact with the alumina at the outer surface of the core stabilizes alumina crystal growth in that part of the core and forms more rugged pebbles. The mullite in the shell also forms a better interlocking crystal structure with the alumina at the surface of the core so as to effect a better bond between the shell and the core. Moreover, mullite is more attrition and heat-shock resistant than pure alumina grains and is preferred for this reason.

It is apparent that a shell of any appreciable thickness when formed of 325 mesh or finer particles and glazed by firing is advantageous in improving the attrition resistance of an alumina pebble. However, a layer or shell of considerable thickness is preferred because of the longer wearing qualities of the pebble to which it is attached. When compacting pebbles of $\frac{1}{16}''$ to $1''$ in diameter the core should be equal in diameter to between $\frac{1}{4}$ and $\frac{1}{10}$ of the diameter of the finished pebble. This provides a glazed shell of a minimum thickness of $\frac{1}{20}$ of the diameter of the pebble.

The alumina for the core is preferably formed of tabular or alpha corundum and is lightly calcined at a temperature in the range of 1800° to 2300° F. before compacting into cores so as to reduce the shrinkage during final firing of the pebble. Any of the substantially pure alumina hydrates which are readily convertible to alpha corundum upon heating to the above range may be used as a source of the alumina for the pebble cores. Purified bauxite and the alumina manufactured by the Bayer process are examples of suitable raw materials for both the pebble core and pebble shell. A typical analysis of alpha corundum suitable for the process is the following:

| | Percent |
|---|---|
| $Al_2O_3$ | 99.5 |
| $Na_2O$ | 0.20 |
| $Fe_2O_3$ | 0.25 |
| $SiO_2$ | 0.05 |

Bayer process alumina precalcined to 2100° F. is cooled, crushed, and screened to give a center cut of 50 to 150 mesh material. The 50 to 150 mesh alumina is mixed with 5 weight per cent powdered rosin in a cement-type mixer or tumbler and heated with a hot stream of air to the range of 400 to 450° F. and the heated mixture is tumbled so as to nodulize the alumina to spheres averaging $\frac{1}{16}''$ to $\frac{1}{4}''$ in diameter. The undersize and oversize spheres are separated by screening and returned to the process for renodulizing. The spheres of selected diameter which are to form the cores of the pebbles are introduced to a 3-dimensional tumbling drum which is swept with a heated air stream until the cores are at a temperature just above 300° F. A homogeneous mixture of equal parts of alumina and precalcined Indian kyanite of 400 to 600 mesh size and 5 per cent by weight of powdered rosin is added and the tumbling effected with excess powdered material present at all times until the spheres have reached an average diameter of $\frac{3}{8}''$.

The pebbles are then calcined at 1000° F. for two hours so as to drive off all of the binder and the temperature is thereafter gradually raised over a twelve hour period to 3000° F. and the pebbles are fired at this temperature for four hours, after which they are allowed to cool gradually over a twenty-four hour period.

The resulting pebbles are approximately $\frac{3}{8}''$ in diameter and have a smooth, glazed surface consisting of fine grains of mullite interlocked with fine grains of alumina. The average crushing strength between parallel steel plates is approximately 1500 pounds and the porosity averages approximately 11%. The accelerated attrition rate of these pebbles is 2.9 weight per cent loss for one hundred hours rotation in an attrition mill as compared with a weight loss between 17.5 and 29.3 per cent for 99.5 per cent alumina pebbles prepared from average grain size material as represented by commercial pebbles. When tested in the accelerated heat-mechanical-shock testing equipment described in copending application of S. P. Robinson and R. R. Goins, Serial No. 64,936, filed December 13, 1948, 324 cycles are required for reaching the half life of these pebbles (50% broken) as compared with 138 cycles for the best commercially available alumina pebbles.

I claim:

1. A process for manufacturing $\frac{1}{16}''$ to $1''$ pebbles of improved resistance to thermal and mechanical shock and to abrasion in gravitating-bed heat-exchange processes, which comprises compacting a pebble core of a diameter in the range of $\frac{1}{4}$ to $\frac{1}{10}$ of the diameter of the pebble from 50 to 150 mesh alumina and a volatile binder; encasing said core with a compact layer consisting essentially of a volatile binder and at least 325 mesh material selected from the class consisting of alumina, alumina-silica, and alumina-aluminum silicate to form the balance of the pebble; and calcining the pebble at a temperature in the range of 2900° to 3200° F. for at least 2 hours and until the porosity lies in the range of 5 to 20 per cent so as to form a firm bond in the pebble and fix the shell to the core.

2. The process of claim 1 in which the encasing material is alumina.

3. The process of claim 1 in which the encasing material is alumina-silica in the proportions of at least 1.5 mols of alumina to each mol of silica and the silica in the casing is reacted with alumina during the calcination to form mullite.

4. The process of claim 1 in which the encasing material is alumina-aluminum silicate in proportions such that the casing contains no free silica after calcination.

5. A process for manufacturing $\frac{1}{16}''$ to $1''$ pebbles of improved resistance to thermal and mechanical shock and to abrasion in gravitating-bed heat-exchange processes, which comprises compacting a pebble core of a diameter in the range of ¼ to 1/10 of the pebble diameter from alpha corundum of 50 to 150 mesh and a volatile binder; encasing said core with a series of alternate successive compact layers of a tacky organic binder and powdered material of a fineness of at least 325 mesh selected from the class consisting of alumina, alumina-silica, and alumina-aluminum silicate so as to build up a pebble of the selected diameter; and calcining the pebble at an elevated temperature until its surface is glazed and its porosity lies in the range of 5 to 20 per cent.

6. The process of claim 5 in which the calcining temperature lies in the range of 2900° to 3200° F.

7. The process of claim 6 in which the encasing material is alumina.

8. The process of claim 6 in which the encasing material is alumina-silica in the proportions of at least 1.5 mols of alumina to each mol of silica and the silica in the casing is reacted with alumina during the calcination to form mullite.

9. The process of claim 6 in which the encasing material is alumina-aluminum silicate in proportions such that the casing contains no free silica after calcination.

10. The process of claim 6 in which the core is built up by encasing a granular alpha corundum nucleus with successive layers of a tacky organic binder and said 50 to 150 mesh alpha corundum.

11. The process of claim 6 in which the core is formed by extruding a plastic mix of said 50 to 150 mesh alpha corundum into small rods, cutting the rods into short slugs, and compacting the slugs into spheres.

12. The process of claim 1 in which the core is built up by encasing a granular alumina nucleus with successive layers of a tacky binder and said 50 to 150 mesh alumina.

13. The process of claim 1 in which the core is formed by extruding a plastic mix of said 50 to 150 mesh alumina into small rods, cutting the rods into short slugs, and compacting the slugs into spheres.

14. A process for manufacturing heat-exchange pebbles of improved resistance to thermal and mechanical shock and to abrasion in gravitating-bed heat-exchange processes, which comprises tumbling a mixture of 50 to 150-mesh alumina and a minor proportion of powdered rosin at a temperature in the range of 300 to 450° F. so as to render said rosin tacky and gradually produce ball-like pebble cores of a size in the range of ⅛" to ¾"; tumbling said cores with an intimate mixture of at least 325-mesh material of the class consisting of alumina, alumina-silica, and alumina-aluminum silicate and a minor proportion of rosin at a temperature in said range so as to encase said cores with a layer of said material of a thickness of 1/10 to 3 times the diameter of said cores; lightly calcining the resulting balls so as to volatilize and drive off the rosin; and calcining the rosin-free balls at a temperature in the range of 2900 to 3200° F. until their porosity lies in the range of 5 to 20% and their surface is glazed.

15. A process for manufacturing heat-exchange pebbles of improved resistance to thermal and mechanical shock and to abrasion in gravitating-bed heat-exchange processes, which comprises tumbling a mixture of 50 to 150-mesh alumina and a minor proportion of finely comminuted tacky organic binder so as to gradually produce ball-like pebble cores of a size in the range of ⅛" to ¾"; tumbling said cores with an intimate mixture of at least 325-mesh material of the class consisting of alumina, alumina-silica, and alumina-aluminum silicate and a minor proportion of finely comminuted tacky organic binder so as to encase said cores with a layer of said material of a thickness of 1/10 to 3 times the diameter of said cores; lightly calcining the resulting balls so as to volatilize and drive off the binder; and calcining the binder-free balls at a temperature in the range of 2900 to 3200° F. until their porosity lies in the range of 5 to 20% and their surface is glazed.

16. A heat-bonded spherical 1/16" to 1" pebble having a compact dense core formed of 50 to 150 mesh alpha corundum grains encased in a compact, glazed shell consisting essentially of a material selected from the class consisting of alumina, mullite, and alumina-mullite, said shell having been formed by calcining particles of at least 325 mesh fineness of material selected from the class consisting of alumina, alumina-silica, and alumina-aluminum silicate, said pebble having a porosity in the range of 5 to 20 per cent, the outer crystals in said core being heat-bonded to the inner crystals of said shell.

17. The pebble of claim 16 having a mullite shell.

18. The pebble of claim 16 having an alumina shell.

19. The pebble of claim 16 having a mullite-alumina shell.

SAM P. ROBINSON.

References Cited in the file of this patent

UNITED STATES PATENTS

| Number | Name | Date |
|---|---|---|
| 2,112,380 | Price | Mar. 29, 1938 |
| 2,316,726 | Spicer et al. | Apr. 13, 1943 |
| 2,328,573 | Montgomery et al. | Sept. 7, 1943 |
| 2,432,873 | Ferro, Jr., et al. | Dec. 16, 1947 |
| 2,458,165 | Holm | Jan. 4, 1949 |
| 2,460,811 | Davies et al. | Feb. 8, 1949 |
| 2,489,628 | Evans | Nov. 29, 1949 |
| 2,494,695 | Fischer | Jan. 17, 1950 |
| 2,499,704 | Utterback | Mar. 7, 1950 |
| 2,532,606 | Church | Dec. 5, 1950 |
| 2,532,613 | Dutcher | Dec. 5, 1950 |